C. FEDDERN.
CHECK NOTCHING DEVICE.
APPLICATION FILED SEPT. 21, 1916.
1,229,176.
Patented June 5, 1917.
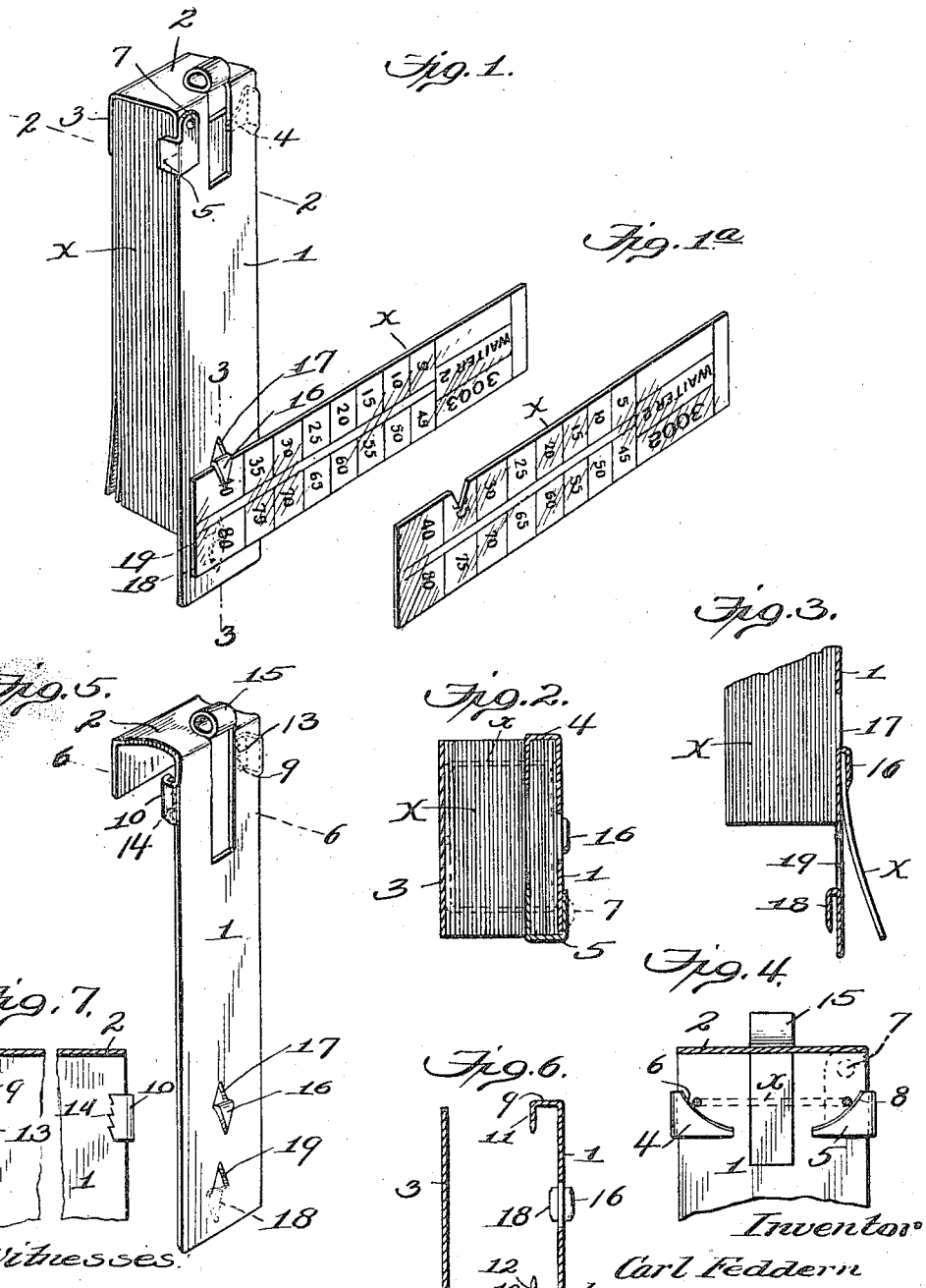

UNITED STATES PATENT OFFICE.

CARL FEDDERN, OF PHILADELPHIA, PENNSYLVANIA, ASSIGNOR TO GLOBE TICKET COMPANY, OF PHILADELPHIA, PENNSYLVANIA, A CORPORATION OF PENNSYLVANIA.

CHECK-NOTCHING DEVICE.

1,229,176.  Specification of Letters Patent.  Patented June 5, 1917.

Application filed September 21, 1916. Serial No. 121,463.

*To all whom it may concern:*

Be it known that I, CARL FEDDERN, a citizen of the United States, residing at Philadelphia, in the county of Philadelphia and State of Pennsylvania, have invented new and useful Improvements in Check-Notching Devices, of which the following is a specification.

My present invention relates to improvements in devices for holding a supply of tickets or checks and for indicating thereon different amounts or values, the invention being particularly adapted for use in restaurants, cafés and the like, for indicating the amounts of purchases or the amounts to be paid to the cashier.

The primary object of the invention is to provide an improved device of this character which is not only relatively inexpensive but is capable of manipulation with facility by the user and serves to cut a clean notch in the edge of the ticket or check at a point thereof corresponding to the amount of the purchase or the amount to be paid to the cashier, thereby obviating the inconvenience of carrying and using a punch as heretofore.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 is a perspective view of a check-holding and notching device constructed in accordance with one embodiment of the invention, the same being viewed from the rear and showing diagrammatically the mode of notching a check or ticket.

Fig. 1ª shows a ticket or check after the same has been notched,

Fig. 2 represents a transverse section through the check or ticket holder on the line 2—2 of Fig. 1.

Fig. 3 represents a section on the line 3—3 of Fig. 1 showing diagrammatically the mode of notching a check or ticket.

Fig. 4 represents a section taken longitudinally through a portion of the holder showing the mode of retaining a pad or stack of checks therein.

Fig. 5 is a perspective view of another embodiment of the invention.

Fig. 6 represents a section on the line 6—6 of Fig. 5.

Fig. 7 represents a section taken longitudinally through a portion of the holder shown in Fig. 5 and illustrating the retaining means for the pad of checks or tickets.

Similar parts are designated by the same reference characters in the several views.

The present invention is adapted to be used in all instances where it is desirable to indicate on checks, tickets or the like, debit or value amounts which the tickets or checks are intended to represent. The invention may be used to especial advantage in restaurants and cafés to enable the waiter or attendant to easily and quickly supply the customer with a check or ticket bearing an indication of the amount of the purchase or the amount the customer is required to pay the cashier. The accompanying drawing shows certain embodiments of the invention and the same will be hereinafter described in detail. It is to be understood, however, that the invention is not restricted to the precise constructions shown and described, as equivalent constructions are contemplated and will be included within the scope of the claims.

Preferably, and as shown in the present embodiments of the invention, the device is composed of sheet metal of suitable thickness and dimensions. The device as shown embodies a combined holder for a pad or stack of checks and a notching device for indicating different amounts or values on the tickets or checks. Preferably, the holder comprises a back or base 1, a forwardly directed top 2, and a downwardly directed flange or lip 3, the latter overlying and extending substantially parallel to the back or base portion of the holder. The base or back section 1 of the holder is preferably substantially the same width as the pad or stack of tickets or checks designated X, although this base or back section is preferably somewhat longer than the pad or stack of tickets. The top section 2 preferably corresponds to the cross-section of the upper or stub end of the pad or stack of tickets while the flange or lip 3 preferably corresponds in length to that of the stub of the pad or stack of tickets, thus overlying the stub to retain the same in the holder and providing a tearing edge to facilitate separation or detachment of the checks or tickets from the stub.

Different means may be provided for retaining the pad or stack of checks in the holder. It is usual to fasten together the tickets or checks used in restaurants by passing a staple $x$ through the stub ends of the checks, thus forming a pad. In that form of the invention shown in Figs. 1–4 inclusive, the pad of checks or tickets is retained in the holder by providing the holder with a pair of retaining lugs 4 and 5 which are adapted to penetrate opposite sides of the pad of checks at points where these lugs will engage the staple and thereby prevent pulling or accidental detachment of the pad from the holder. As shown, the lug 4 is extended forwardly from one edge of the base 1 and is then turned inwardly into substantial parallelism with the forward face of the base, the upper edge 6 of this lug being preferably curved and beveled, as shown. The other lug 5 is movable relatively to the lug 4 in order to facilitate introduction of a pad or removal of the stub of a used pad. Preferably, and as shown, the lug 5 is pivoted, at 7, to the rear side of the base 1, the pivot being located out of line with the lug 4, and the lug 5 then extends forwardly past the adjacent edge of the base 1 and thence inwardly in substantial parallelism to the forward face of the base 1. The upper edge 8 of the lug 5 is also preferably curved and beveled, as shown. With this construction, the lug 5 is swung upwardly about its pivot 7 and a pad of checks or tickets may then be inserted by sliding the same laterally into the space between the base 1 and the flange 3, this lateral movement of the pad causing the stationary lug 4 to penetrate the adjacent side of the stub portion of the pad at such a point that the staple $x$ will assume a position between the upper edge 6 of this lug and the top 2 of the holder, or the staple may come into engagement with this beveled or curved edge 6. After the pad has been fully inserted into the holder, the lug 5 is swung inwardly into the position shown in Figs. 1 and 2, this lug being thereby caused to penetrate the adjacent side of the stub portion of the pad at a point below the staple, and the staple may be engaged by the beveled or curved edge 8 of this lug. The lugs 4 and 5 thereby act to securely retain the pad in the holder, it being obvious that the pad cannot be accidentally detached from the holder except by opening or swinging aside the lug 5. By utilizing the staple as a means to coöperate with the lugs to retain the pad in the holder, a secure fastening for the pad is attained.

Figs. 5, 6 and 7 show another mode of retaining a pad of checks or tickets in the holder. In the latter instance the holder is constructed in the same general form as that shown in Figs. 1–4 inclusive, the pad retaining means, however, differing therefrom in the respect that the base or back section of the holder is formed with a pair of lugs 9 and 10 which proceed from opposite edges of the base section and are rigidly positioned, these lugs having inturned portions 11 and 12 which overlie for a short distance the forward side of the base section, and the inner edges of these inturned portions are provided with relatively sharp teeth or serrations 13 and 14 which are adapted to bite into the sides of the pad and thereby retain the latter in the holder. Preferably, and as shown, these teeth 13 and 14 have their biting edges directed upwardly or toward the top of the holder. The pad is introduced into the holder by sliding the stub end thereof upwardly between the lugs 9 and 10 and between the base section and the overlying flange. In both embodiments shown, an eye or loop 15 may be provided at the top of the holder for attachment to a clip. Preferably, and as shown, this eye or loop when used is composed of a strip of the metal punched as a tongue from the base or back of the holder, the strip or tongue being rolled to form the eye or loop.

The notching device for indicating the debit or value amounts on the checks or tickets comprises a substantially V-shaped tongue which is punched from the base or back section of the holder and is then doubled thereon, the base of the V-shaped tongue being attached to the back section and forming a stop against which the edge of the ticket engages, thereby positioning the notching tongue in proper relation to the values or amounts arranged in rows or columns on the checks or tickets, and the tongue is spaced from the adjacent face of the base or back a distance slightly greater than the thickness of the tickets or checks. Fig. 1 shows diagrammatically the mode of inserting a check or ticket for notching by one of the tongues. After the check or ticket has been so inserted, notching thereof is effected by the simple operation of pulling the edge of the check or ticket opposite to that engaged beneath the tongue in a direction away from the base or back of the holder, this operation causing the apex or point of the V-shaped or substantially triangular tongue to initially penetrate the paper or material composing the check or ticket, and as the operation of pulling the check or ticket away from the holder continues, the divergent side edges of the tongue operate to complete the cutting or tearing of the check or ticket to form the notch which latter extends to the adjacent edge or margin of the check. The notched check or ticket is shown in Fig. 1ª. One of these notch-forming tongues may be provided on the rear side of the base or back section or one of these notch-forming tongues may be formed on the forward side of the base or back section, or one of these tongues may be provided at the rear and another at the front side of the base section, as shown in the present instance. The notch-forming tongue 16 at the rear side of the base section is punched from the hole 17 in the base section, and the notch-forming tongue 18 is punched from the hole 19 in the base section, the tongue 16 being doubled upon the rear side of the base section while the tongue 18 is doubled upon the forward side thereof. The apex and the sides of the tongue are preferably beveled, as shown, to form a sharp piercing point and keen cutting edges diverging therefrom. In using either or both of these notch-forming tongues, it is preferable that the point or apex of the tongue should be directed toward the lower end of the holder, as this facilitates introduction of the edge of the check or ticket beneath it preparatory to the notching of the check or ticket. In those instances where the notch-forming tongue is provided at the forward side of the base section, the latter is extended below the lower end of the check or ticket pad, as shown in the present instance, but where one of these notch-forming tongues is formed only at the rear side of the holder, it is unnecessary to extend the base or back section below the check or ticket pad.

By arranging the notch-forming tongue in fixed or rigid relation with the base or support, the operation of notching the check or ticket is greatly facilitated, because the tongue will sustain the force imposed upon it incident to the notching of the check without requiring the user to press upon the tongue to hold it in place during such operation. This is an advantageous feature as it enables the notching of the checks or tickets to be effected quickly and requires the use of only one hand for the operation. The rigid relation of the notch-forming tongue to the base or support also insures the maintenance of the proper distance between the tongue and the support for the reception of the edge of the check or ticket. By forming the tongue from the material composing the base or support, not only is the construction simple and inexpensive, but the doubled part of the tongue forms a stop for the marginal edge of the check or ticket, thereby determining the depth of the notch in the check or ticket.

I claim as my invention:—

1. In a device of the character described, a support, and a rigid notch-forming tongue rigidly connected at one end to the support and overlying a side of the support, the tongue being rigidly spaced from the support for a distance slightly greater than the thickness of the checks or tickets to be notched, the apex of the tongue being free and pointed and the base of the tongue forming a stop to coöperate with an edge of the check or ticket to position the same.

2. In a device of the character described, a support having a rigid tongue struck therefrom and doubled to overlie a side of the support, the free end of the tongue being pointed and the sides thereof forming sharp cutting edges, the base of the tongue forming a limiting stop to coöperate with an edge of a check or ticket inserted between the tongue and support.

In testimony whereof I have hereunto set my hand in presence of two subscribing witnesses.

CARL FEDDERN.

Witnesses:
 WARREN J. CORE,
 P. C. SNOW.